(12) United States Patent
Pusheck et al.

(10) Patent No.: US 10,942,079 B2
(45) Date of Patent: *Mar. 9, 2021

(54) RECTANGULAR SNAP FIT PRESSURE SENSOR UNIT

(71) Applicant: VEONEER US INC., Southfield, MI (US)

(72) Inventors: Jacob Pusheck, West Bloomfield, MI (US); Joshua Forwerck, Royal Oak, MI (US)

(73) Assignee: VEONEER US INC., Southfield, MI (US)

( * ) Notice: Subject to any disclaimer, the term of this patent is extended or adjusted under 35 U.S.C. 154(b) by 224 days.

This patent is subject to a terminal disclaimer.

(21) Appl. No.: 15/939,425

(22) Filed: Mar. 29, 2018

(65) Prior Publication Data

US 2019/0301959 A1 Oct. 3, 2019

(51) Int. Cl.
*G01L 19/14* (2006.01)
*B60R 21/0136* (2006.01)
*G01L 23/10* (2006.01)
*G01L 23/22* (2006.01)
*G01L 23/32* (2006.01)
(Continued)

(52) U.S. Cl.
CPC .......... *G01L 19/147* (2013.01); *G01D 11/245* (2013.01); *G01L 19/003* (2013.01); *G01L 19/0007* (2013.01); *G01L 19/0038* (2013.01); *G01L 19/0654* (2013.01); *G01L 19/14* (2013.01); *G01L 19/141* (2013.01); *G01L 19/142* (2013.01); *G01L 19/143* (2013.01);
(Continued)

(58) Field of Classification Search
CPC ........................ Y10T 403/7007; G01L 19/003
See application file for complete search history.

(56) References Cited

U.S. PATENT DOCUMENTS 5,257,547 A * 11/1993 Boyer ................. G01L 19/0038
338/4
5,435,339 A * 7/1995 Hayes ................... F16K 31/528
137/315.04
(Continued)

FOREIGN PATENT DOCUMENTS

DE 102013208537 7/2014 .............. G01L 11/00
EP 202786 4/1986
(Continued)

*Primary Examiner* — Jill E Culler
*Assistant Examiner* — Ruben C Parco, Jr.
(74) *Attorney, Agent, or Firm* — Christopher P. Maiorana, PC

(57) ABSTRACT

An apparatus includes a base assembly, a gasket and a housing assembly. The base assembly may have a locking feature and a bearing feature. The locking feature may have a first passage in communication with an exterior of the apparatus. The gasket may be disposed on the base assembly and may have (i) a base portion, (ii) a column portion and (iii) a second passage in communication with the first passage. The housing assembly may have a sealing feature and may be configured to hold a sensor. The sealing feature (a) may mate with the bearing feature and (b) may compress the base portion of the gasket. The sensor (a) may seal to the column portion of the gasket and (b) may be in communication with the exterior of the apparatus through the first passage and the second passage.

20 Claims, 15 Drawing Sheets

(51) Int. Cl.
    *G01L 19/06*     (2006.01)
    *G01D 11/24*     (2006.01)
    *G01L 19/00*     (2006.01)

(52) U.S. Cl.
    CPC ............ *G01L 23/10* (2013.01); *G01L 23/225* (2013.01); *G01L 23/32* (2013.01)

(56) References Cited

U.S. PATENT DOCUMENTS

| | | |
|---|---|---|
| 8,302,484 B2 | 11/2012 | Henzler et al. ................. 73/756 |
| 8,528,413 B2 | 9/2013 | Seitz et al. ...................... 73/753 |
| 8,643,127 B2 * | 2/2014 | Dangtran ............. B81B 7/0019 257/415 |
| 8,931,348 B2 | 1/2015 | Kunert |
| 9,194,413 B2 | 11/2015 | Christoph et al. |
| 9,260,071 B2 | 2/2016 | Murray, Jr. et al. |
| 9,360,348 B2 | 6/2016 | Henzler et al. |
| 9,714,851 B2 | 7/2017 | Bertsch et al. |
| 10,670,485 B2 * | 6/2020 | Pusheck ................... G01L 19/14 |
| 2013/0192361 A1 | 8/2013 | Herderich et al. |
| 2016/0061682 A1 * | 3/2016 | Ramsay ................ G01L 19/147 73/706 |
| 2016/0204525 A1 | 7/2016 | Herrmann et al. |
| 2017/0350778 A1 * | 12/2017 | Gadini ................... G01L 19/143 |
| 2018/0246001 A1 * | 8/2018 | Kim ...................... G01L 19/0038 |
| 2019/0086245 A1 * | 3/2019 | Kim ...................... G01D 11/245 |

FOREIGN PATENT DOCUMENTS

| | | | |
|---|---|---|---|
| EP | 2918454 | 3/2015 | ............ B60R 19/48 |
| EP | 2938986 | 11/2015 | ............ G01L 10/06 |
| WO | WO2004/113857 | 12/2004 | |
| WO | WO2009/077269 | 6/2009 | ............ B29C 45/16 |
| WO | WO2013/010711 | 1/2013 | ............ G01D 11/24 |
| WO | WO2014/102192 | 7/2014 | ............ G01D 11/24 |

* cited by examiner

RECTANGULAR SNAP FIT PRESSURE SENSOR UNIT

FIELD OF THE INVENTION

The invention relates to vehicle sensors generally and, more particularly, to a method and/or apparatus for implementing a rectangular snap fit pressure sensor unit.

BACKGROUND

Sensors are used for many different operations within a vehicle. In an example, occupant restraint and safety systems typically sense changes in pressure at key points within the vehicle. Sensors are conventionally packaged with supporting electronics and typically mounted on a printed circuit board. The printed circuit board is then mounted into a housing or directly to a vehicle structure. Such mounting can cause a number of problems related to manufacturing and reliability.

It would be desirable to implement a rectangular snap fit pressure sensor unit.

SUMMARY

The invention concerns an apparatus including a base assembly, a gasket and a housing assembly. The base assembly may have a locking feature and a bearing feature. The locking feature may have a first passage in communication with an exterior of the apparatus. The gasket may be disposed on the base assembly and may have (i) a base portion, (ii) a column portion and (iii) a second passage in communication with the first passage. The housing assembly may have a sealing feature and may be configured to hold a sensor. The sealing feature (a) may mate with the bearing feature and (b) may compress the base portion of the gasket. The sensor (a) may seal to the column portion of the gasket and (b) may be in communication with the exterior of the apparatus through the first passage and the second passage.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a rectangular snap fit pressure sensor unit that may (i) employ a rectangular gasket surface to improve sealing performance, (ii) allow for a lower package size, (iii) allow for simplified terminals, (iv) be easier to manufacture than conventional designs, (v) allow manufacturing costs to be reduced, (vi) lower the stress on plastic housings, (vii) provide a secure gasket sealing interface, (viii) establish a watertight environment for a sensor, (ix) properly orient the sensor, (x) provide a poke yoke arrangement such that a housing assembly cannot be placed backwards into a base assembly, (xi) incorporate one or more integrated circuits and/or (xii) be implemented using one or more plastic assembly fabrication techniques.

A current push in industry is to reduce costs and complexity of automotive safety sensors. To accomplish the reductions, embodiments of the invention generally provide a low-cost solution for a pressure sensor unit. A one-product one-process methodology may be employed to create a family of pressure sensor units suitable for multiple installation criteria in multiple types of vehicles. The methodology generally uses a common housing assembly with one or more different attachment pieces that make the pressure sensor units complete. The housing assembly and a base assembly may be connected by way of snap fit and/or plastic weld methods. The base assembly and a mounting assembly may be connected by a rotational interlock. Mass production of a singular type of housing assembly may allow the cost to be reduced. The method generally allows for a simple manufacturing method with low initial equipment investment and very short cycle times.

Figure 1:
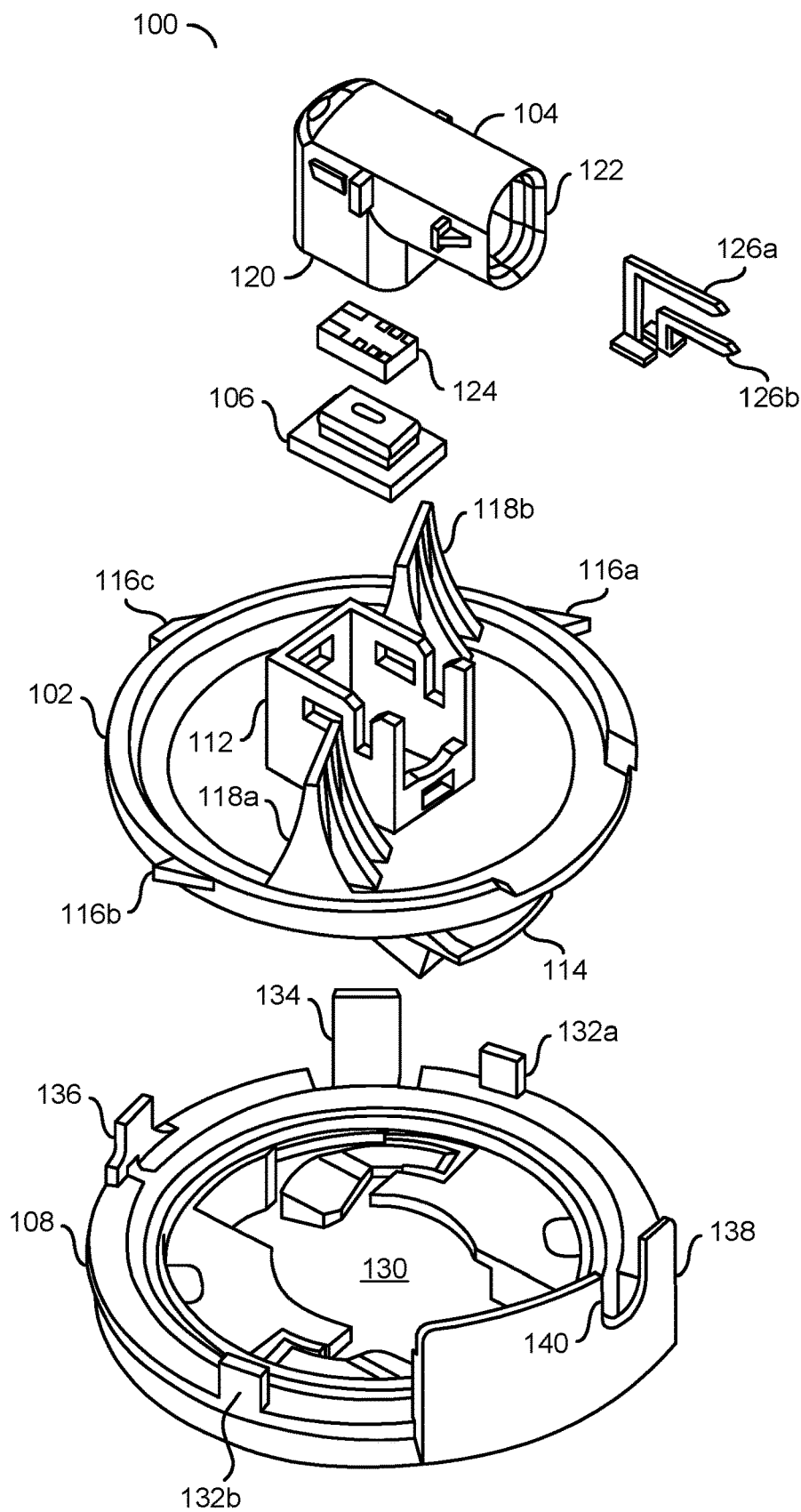
FIG. 1 is a diagram of a sensor unit in accordance with an embodiment of the invention.

Referring to FIG. 1, a diagram of a sensor unit 100 is shown in accordance with an embodiment of the invention. The sensor unit (or apparatus, or system, or device) 100 generally implements a gas pressure sensor suitable for use in automotive applications. The sensor unit 100 generally comprises a base assembly 102, a housing assembly 104, a gasket 106 and a mounting assembly 108.

The base assembly 102 may include a bearing feature 112, a locking feature 114, one or more teeth 116a-116c, and multiple brackets 118a-118b. A passage may be formed through the base assembly 102 and the locking feature 114.

The base assembly 102 may be formed of a hard plastic material and has a generally circular shape. The materials used to fabricate the base assembly 102 may include, but are not limited to, polybutylene terephthalate (PBT) and nylon, and are usually glass filled. The base assembly 102 may be fabricated by injection molding.

The bearing feature 112 may implement multiple walls. The bearing feature 112 may form a rectangular shape column around the gasket 106. The bearing feature 112 is generally operational to engage (e.g., snap to) the housing assembly 104. In various embodiments, the snapping (or locking) may not be reversible. In other embodiments, the bearing feature 112 may be configured to both engage with and disengage from the housing assembly 104 a number of times.

The locking feature 114 may implement a gas coupler (or fitting). The locking feature 114 may be configured to engage and lock to the mounting assembly 108. In various embodiments, the locking feature 114 may provide a surface to connect a hose or pipe containing the gas pressure signal to be measured by the pressure sensor unit 100. In other embodiments, the locking feature 114 may be directly exposed to an environment inside or outside the vehicle such that the pressure sensor unit 100 is directly measuring the surrounding (e.g., external) environmental pressure.

In various embodiments, the base assembly 102 may be configured to secure the pressure sensor unit 100 to a structure of a motor vehicle (e.g., automobile, truck, train and the like). The base assembly 102 may be customized to meet the mounting criteria of a particular application. The uniqueness of the base assembly 102 may result in a family of base assemblies 102. The housing assembly 104 may be interchangeable among different styles of base assemblies 102. Each type of base assembly 102 may have a common set of features to connect with a single type of housing assembly 104, and a unique set of features to account for the different installation criteria.

The housing assembly 104 may include a rectangular sealing feature 120, a connector 122, a sensor 124 and multiple terminals 126a-126b. The housing assembly 104 may be formed of the same hard plastic material used to create the base assembly 102. The sealing feature 120 may be configured to form an environmental seal with the gasket 106 while the housing assembly 104 is mated to the base assembly 102. The sealing feature 120 may also be configured to engage with the bearing feature 112 to hold the housing assembly 104 to the base assembly 102. The connector 122 may be configured to connect to an external electrical connector. The terminals 126a-126b may be configured to convey electrical power to a sensor 124 and electrical signals from the sensor 124.

The housing assembly 104 may support the sensor 124. The sensor 124 may be configured to sense a gas (or pneumatic or air) pressure signal. The gas pressure signal may be received from an exterior of the pressure sensor unit 100, through the passage of the base assembly 102, and through another passage through the gasket 106. The pressure sensor 124 is generally operational to convert a measured gas pressure into an electrical signal. The pressure sensor 124 may be fabricated as one or more integrated circuits. Electrical power for the pressure sensor 124 may be received through the terminals 126a-126b in the connector 122. Measured data generated by the pressure sensor 124 may be transferred out of the pressure sensor unit 100 through the terminals 126a-126b of the connector 122.

The gasket 106 is generally rectangular in shape. In various embodiments, (see FIG. 4), the gasket 106 generally comprises a base portion 150, a column portion 152, a face 154 of the column portion 152, a passage (or vent) 156, an optional dimple 158, an optional rib 160 and an optional groove 162. The passage 156 may extend through the gasket 106, including the column portion 152, and align with the passage in the base assembly 102 and the locking feature 114. The gasket 106 may be disposed on the base assembly 102 within the bearing feature 112. The gasket 106 is generally operational to seal an interior of the housing assembly 104 to the base assembly 102. The gasket 106 may also be operational to seal an active side of the sensor 124 from the interior of the housing assembly 104.

The mounting assembly 108 generally comprises an opening 130, one or more tabs 132a-132b, a deformable locking boss 134, a rigid over-travel stop 136 and a shield 138. The mounting assembly 108 may be formed of the same hard plastic material used to create the base assembly 102 and/or the housing assembly 104.

The opening 130 may be shaped to receive the locking feature 114 of the base assembly 102. The tabs 132a-132b may be positioned to engage the teeth 116a-116b of the base assembly 102 when the base assembly 102 is rotated relative to the mounting assembly 108. The element 134 may support locking of the base assembly 102 to the mounting assembly 108. The element 136 may provide an over-travel stop barrier to engage the tooth 163c so that the base assembly 102 may not be rotated too far. The shield 138 may be used to retain a harness connector engaged with the connector 122 while the base assembly 102 is locked with the mounting assembly 108. The shield 138 may include a notch 140 that allows the harness to be routed in-line with the connector 122 thus avoiding sharp bends.

In various embodiments, the mounting assembly 108 may secure the pressure sensor unit 100 to a structure of a motor vehicle. The mounting assembly 108 may be customized to meet the mounting criteria of a particular application. The uniqueness of the mounting assembly 108 may result in a family of mounting assemblies 108. The base assembly 102 may be interchangeable among different styles of mounting assemblies 108. Each type of mounting assembly 108 may have a common set of features to connect with one or more types of base assemblies 102, and a unique set of features to account for the different installation criteria.

Figure 2:
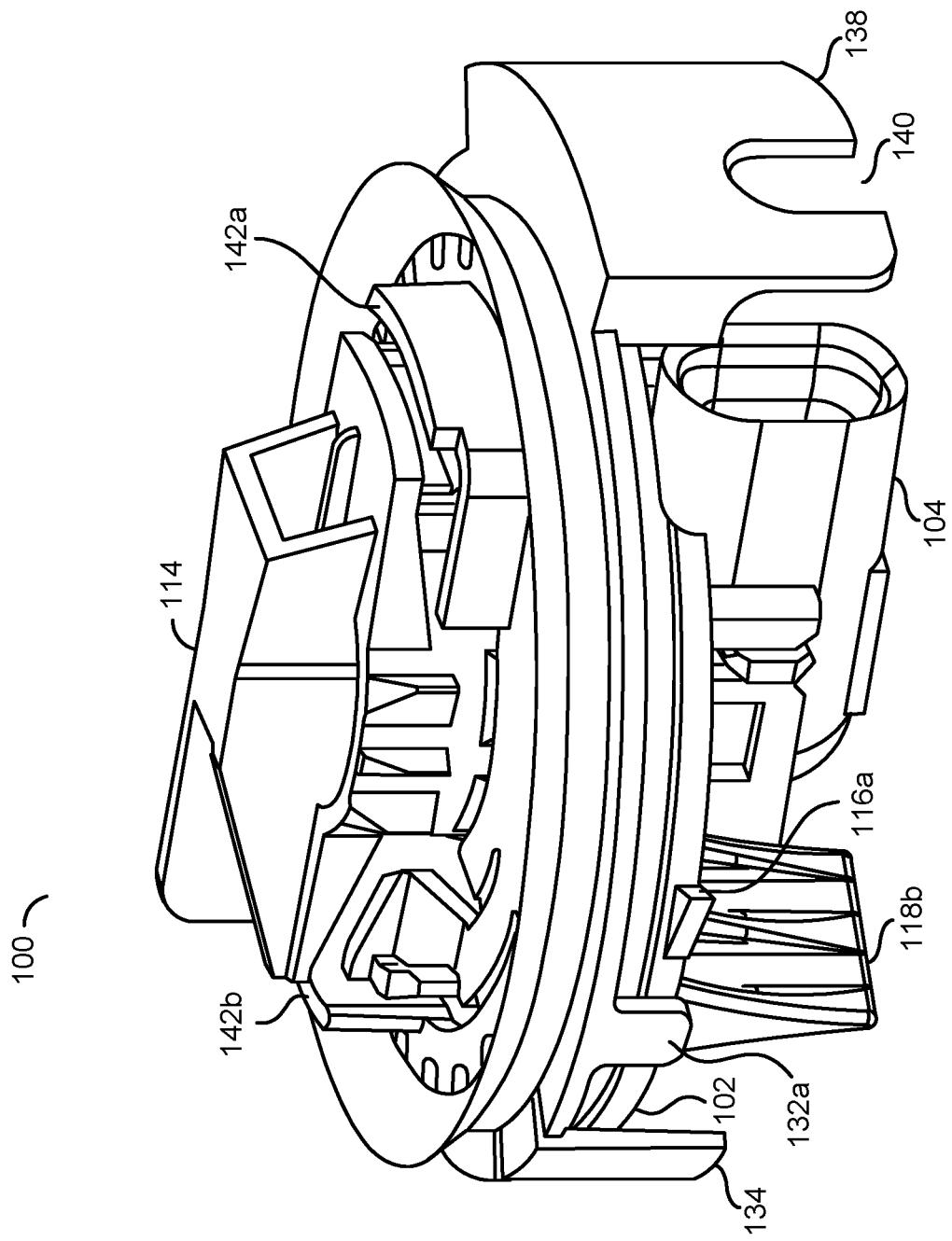
FIG. 2 is a diagram illustrating a perspective view of the sensor unit of FIG. 1 in accordance with an embodiment of the invention.

Referring to FIG. 2, a diagram illustrating a perspective view of the pressure sensor unit 100 is shown in accordance with an embodiment of the invention. A shipping (or uninstalled) state is illustrated. While the base assembly 102 is mated to the mounting assembly 108, the locking feature 114 may extend through the mounting assembly 108 and protrude out a far side. Rotation of the base assembly 102 relative to the mounting assembly 108 generally causes the locking feature 114 to rotate into a locked position. Rotation of the locking feature 114 may be limited by one or more of the mechanical stops 142a-142b of the mounting assembly 108. The side of the pressure sensor unit 100 show in FIG. 2 generally illustrates a "wet" side that may be exposed to an exterior of the vehicle.

Figure 3:
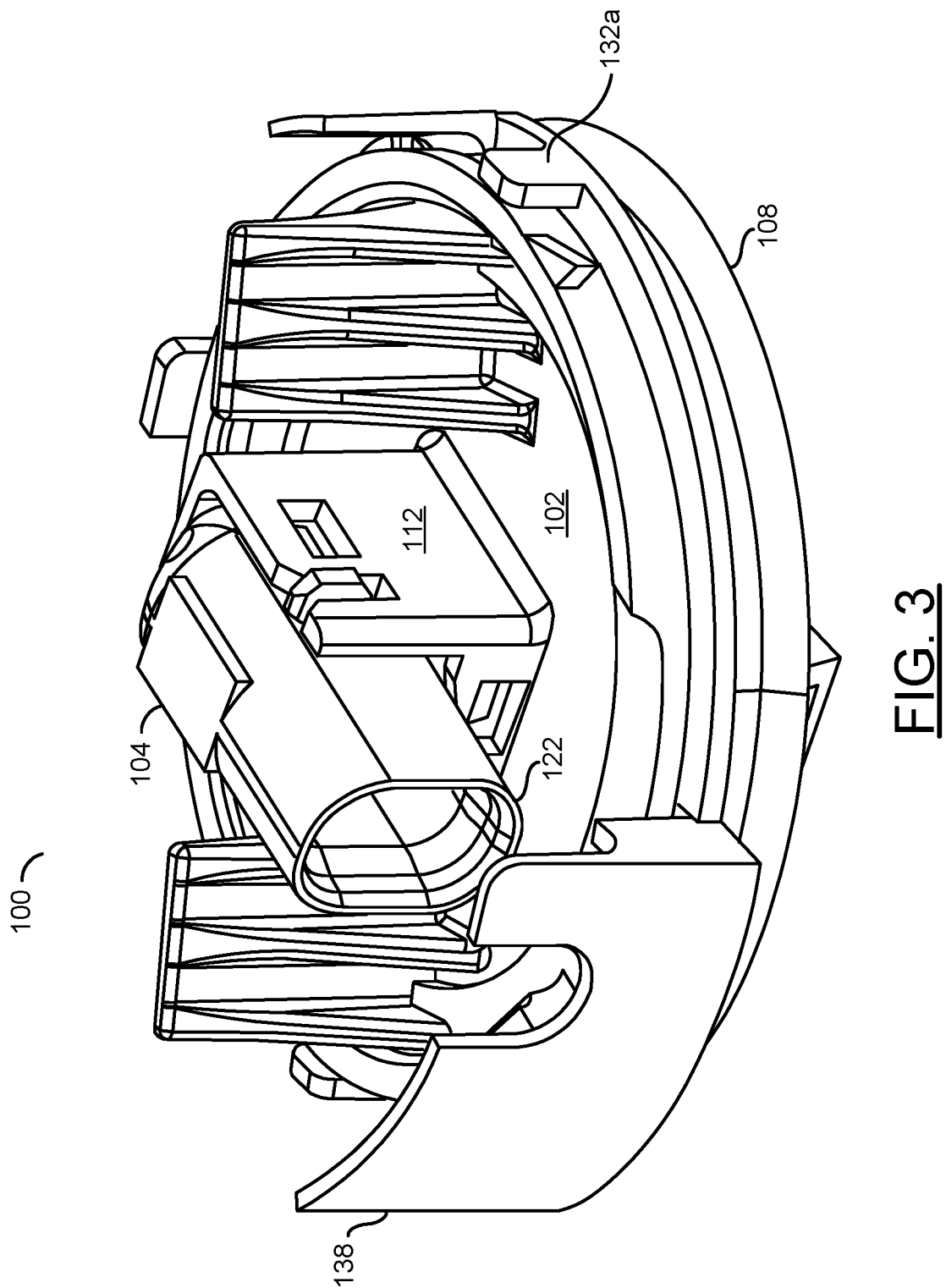
FIG. 3 is a diagram illustrating another perspective view of the sensor unit of FIG. 1 in accordance with an embodiment of the invention.

Referring to FIG. 3, a diagram illustrating another perspective view of the pressure sensor unit 100 is shown in accordance with an embodiment of the invention. The shipping (or uninstalled) state is illustrated. In an installed state, the teeth 116a-116b of the base assembly 102 may engage the tabs 132a-132b of the mounting assembly 108 to lock the two assemblies together. The side of the pressure sensor unit 100 show in FIG. 3 generally illustrates a "dry" side that may be exposed to an interior of the vehicle.

Figure 4:
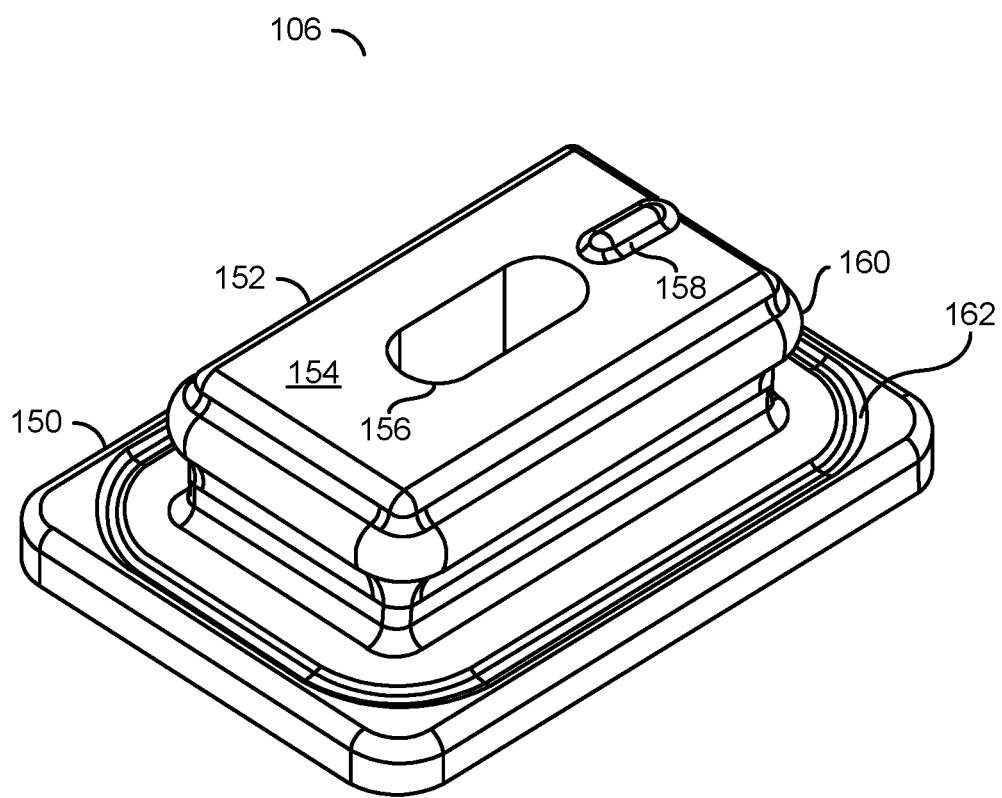
FIG. 4 is a diagram illustrating a gasket in accordance with an embodiment of the invention.

Referring to FIG. 4, a diagram illustrating an example implementation of the gasket 106 is shown in accordance with an embodiment of the invention. The gasket 106 generally comprises the base portion 150 and the column portion 152. The column portion 152 may have a smaller cross-sectional area than the base portion 150, as shown. In various embodiments, the face (or surface) 154 of the column portion 152 may have dimensions larger than a matching surface of the sensor 124. The passage 156 may extend through the base portion 150, the column portion 152 and is exposed at the face 154. The dimple 158 may be included on the face 154 to help bias the sensor 124 against supports and electrical connectors within the housing assembly 104. Additional details of the biasing of the sensor 124 may be found in co-pending U.S. applicationnSer. No. 15/938,667, on Mar. 28, 2018, which is hereby incorporated by reference in its entirety. An optional rib 160 may be provided circumventing the column portion 152. The rib 160 may be located between the face 154 and the base portion 150. An optional groove 162 may be provided in the base portion 150. The groove 162 may circle the column portion 152. In some embodiments, the gasket 106 may be implemented as only the central region 152.

The passage 156 may be aligned at one end with the passage in the base assembly 102. The passage 156 may be aligned at the opposite end with an active side of the pressure sensor 124. In various embodiments, the gasket 106 may be fabricated from a resilient material. The gasket 106 may be fabricated using a two shot injection molding onto the base assembly 102, fabricated separately and subsequently placed on the base assembly 102, or fabricated by any common technique. Material for the gasket 106 may include, but is not limited to silicone-based material, thermoplastic elastomers (TPE) material and thermoplastic rubber material. Other materials may be implemented to meet the design criteria of a particular application. An overall thickness of the gasket 106 may range from approximately 2 millimeters (mm) to approximately 5 mm. Additional details about the gasket 106 may be found in co-pending U.S. application Ser. Nos. 15/924,896, filed Mar. 19, 2018, 15/928,430, filed Mar. 22, 2018 and 15/935,444, filed Mar. 26, 2018, which are hereby incorporated by reference in their entirety.

Figure 5:
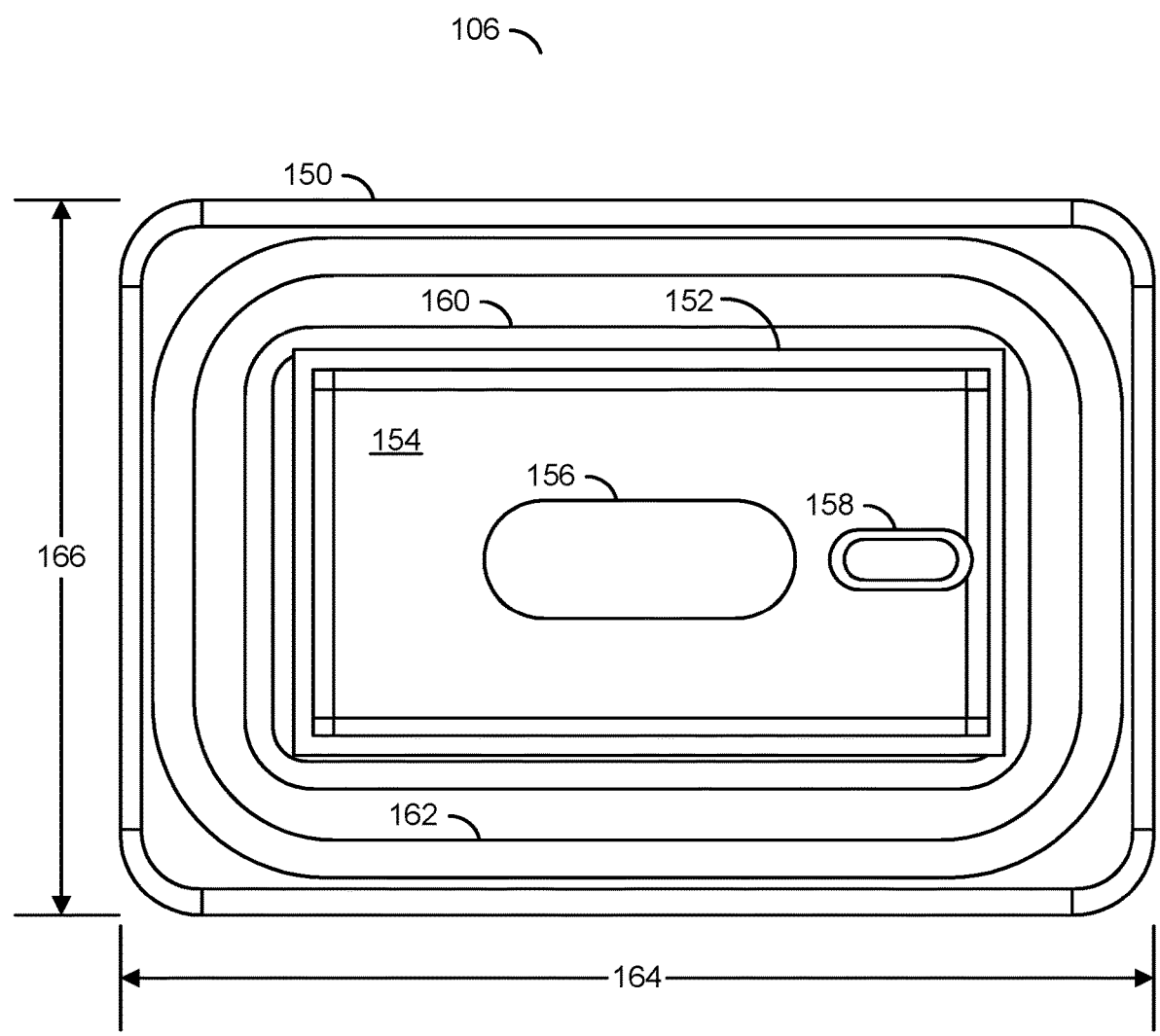
FIG. 5 is a diagram illustrating a top view of a column portion of the gasket in accordance with an embodiment of the invention.

Referring to FIG. 5, a diagram illustrating a top view of the column portion 152 of the gasket 106 is shown in accordance with an embodiment of the invention. The passage 156 may be centered on the base portion 150 and the column portion 152. The dimple 158 is generally disposed between the passage 156 and an outer edge of the column portion 152. The rib 160 generally protrudes outward from the column portion 152.

In various embodiments, the base portion 150 of the gasket 106 may have dimensions of (i) approximately 6 millimeters (mm) to approximately 12 mm by (ii) approximately 4 mm to approximately 6 mm. A thickness of the base portion 150 may range from approximately 1 mm to 2 mm. The column portion 152 of the gasket 106 may have dimensions of (i) approximately 4 millimeters (mm) to approximately 8 mm by (ii) approximately 2 mm to approximately 4 mm. A total thickness of the column portion 152 may be in a range from approximately 2 mm to approximately 4 mm. A total thickness of the gasket 106 (e.g., a thickness of the base portion 150 and the column portion 152) may range from approximately 2 mm to 5 mm. Other dimensions may be implemented to meet the design criteria of a particular application.

Figure 6:
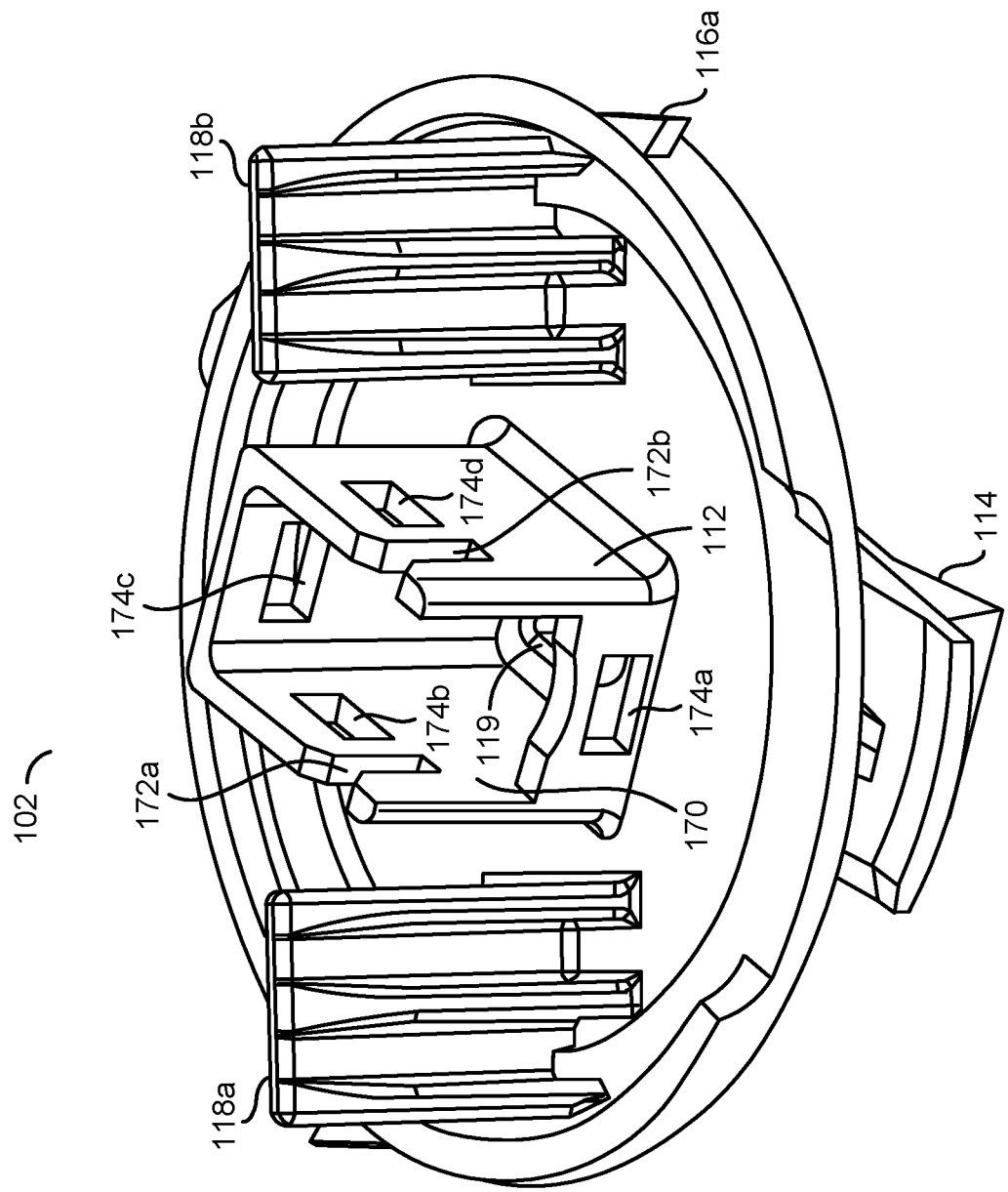
FIG. 6 is a diagram illustrating a base assembly accordance with an embodiment of the invention.

Referring to FIG. 6, a diagram illustrating an example implementation of the base assembly 102 is shown in accordance with an embodiment of the invention. The bearing feature 112 of the base assembly 102 may be divided into multiple (e.g., four) segments. An opening 170 may be provided in one of the segments. Slots 172a-172b may be provided on opposing walls of the bearing feature 112. Windows 174a-174d may be provided, one in each wall of the bearing feature 112. The bearing feature 112 may be configured to deform (or flex) as the rigid sealing feature 120 is forced into the center of the bearing feature 112. In various embodiments, the bearing feature 112 may be rigid and the sealing feature 120 may be deformable.

The opening 170 and the slots 172a-172b may be used for alignment of the housing assembly 104 to the base assembly 102. The opening 170 may receive the sealing feature 120 in a single orientation. The slots 172a-172b may be offset from a center of the bearing feature 112 to further prevent improper orientations (e.g., rotated ±90 and/or 180 degrees) between the housing assembly 104 and the base assembly 102. A passage 119 in the base assembly 102 may provide a route to bring the gas pressure to the sensor 124. The passage 119 may align with the passage 156 in the gasket 106 (see FIG. 4).

Figure 7:
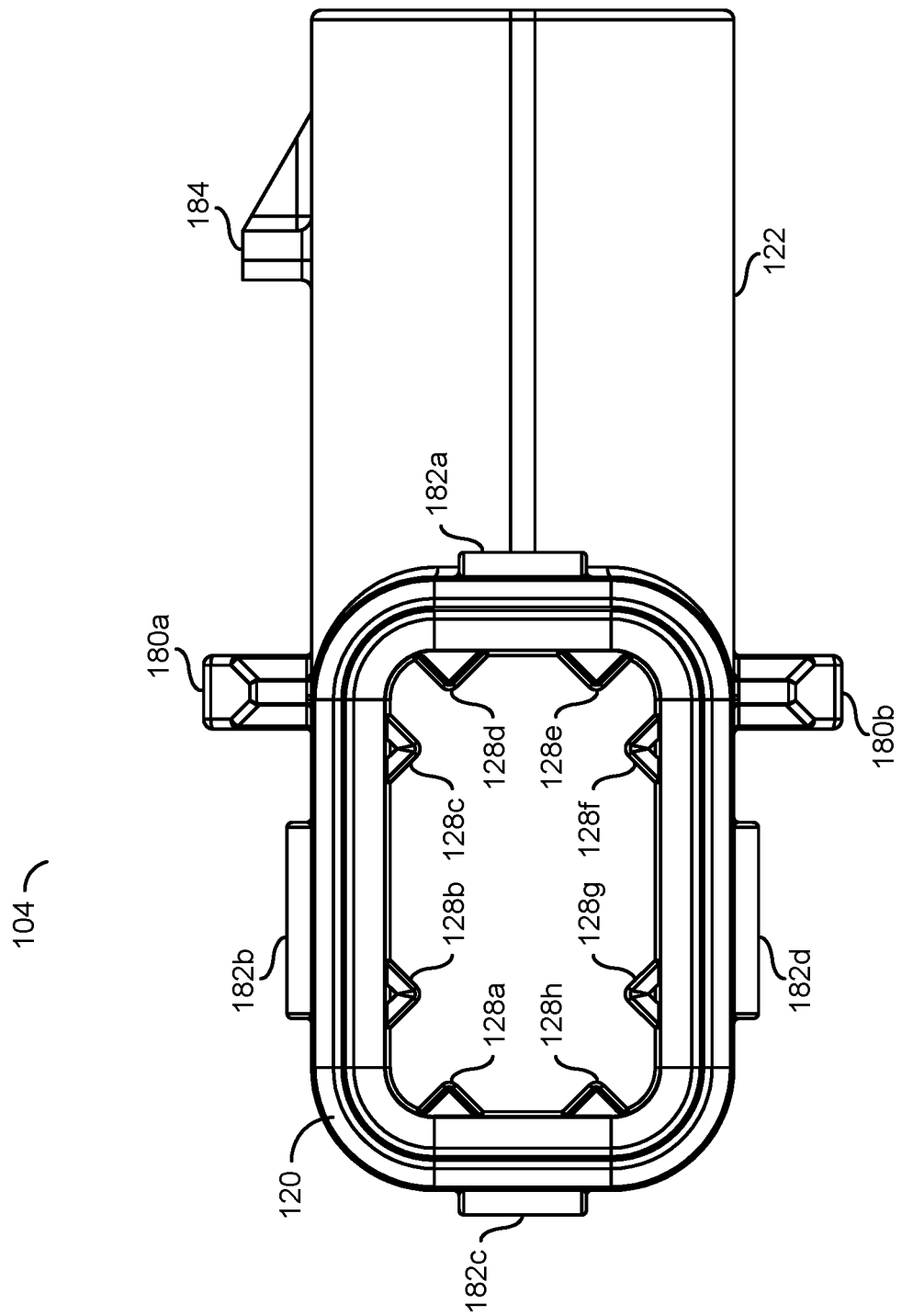
FIG. 7 is a diagram illustrating a housing assembly in accordance with an embodiment of the invention.

Referring to FIG. 7, a diagram illustrating an example implementation of the housing assembly 104 is shown in accordance with an embodiment of the invention. The housing assembly 104 may include multiple posts 128a-128h, multiple (e.g., two) alignment features 180a-180b, multiple teeth 182a-182d and a tab 184.

The posts 128a-128h may be configured to orient and hold the sensor 124 in a proper location to both contact the terminals 126a-126b (see FIG. 1) and connect with the passage 156 in the gasket 106 (see FIG. 4). The posts 128a-128h may ensure that the sensor 124 interfaces with the electrical and mechanical contact locations in the correspondingly correct locations on the sensor 124.

While the housing assembly 104 is mated to the base assembly 102, the alignment features 180a-180b may reside within the slots 172a-172b of the bearing feature 112. If an attempt is made to attach the housing assembly 104 to the base assembly 102 out of the proper orientation, the connector 122 may not align with the opening 170, and the alignment features 180a-180b may not align with the slots 172a-172b. The misalignments may prevent the sealing feature 120 from properly seating in the bearing feature 112. The slots 172a-172b with the alignment features 180a-180b, and/or the connector 122 with the opening 170 generally allows the housing assembly 104 and the base assembly 102 to connect in a single orientation.

The teeth 182a-182d may be configured to engage the windows 174a-174d of the bearing feature 112. While engaged (e.g., snapped to the windows 174a-174n ), the teeth 182a-182d may secure the housing assembly 104 to the base assembly 102. In various embodiments, the teeth 182a-182d and the windows 174a-174d may be configured so that the snapping is not reversible. In other embodiments, the teeth 182a-182d and the widows 174a-174d may be configured to both engage with and disengage from each other a number of times.

The tab 184 may lock the connector 122 to a harness connector. The harness connector may electrically connect to the terminals 126a-126b (see FIG. 1). In various embodiments, the tab 184 may be configured so that the locking cannot be undone. In other embodiments, the tab 184 may be configured to both engage with and disengage from the harness connector a number of times.

Figure 8:
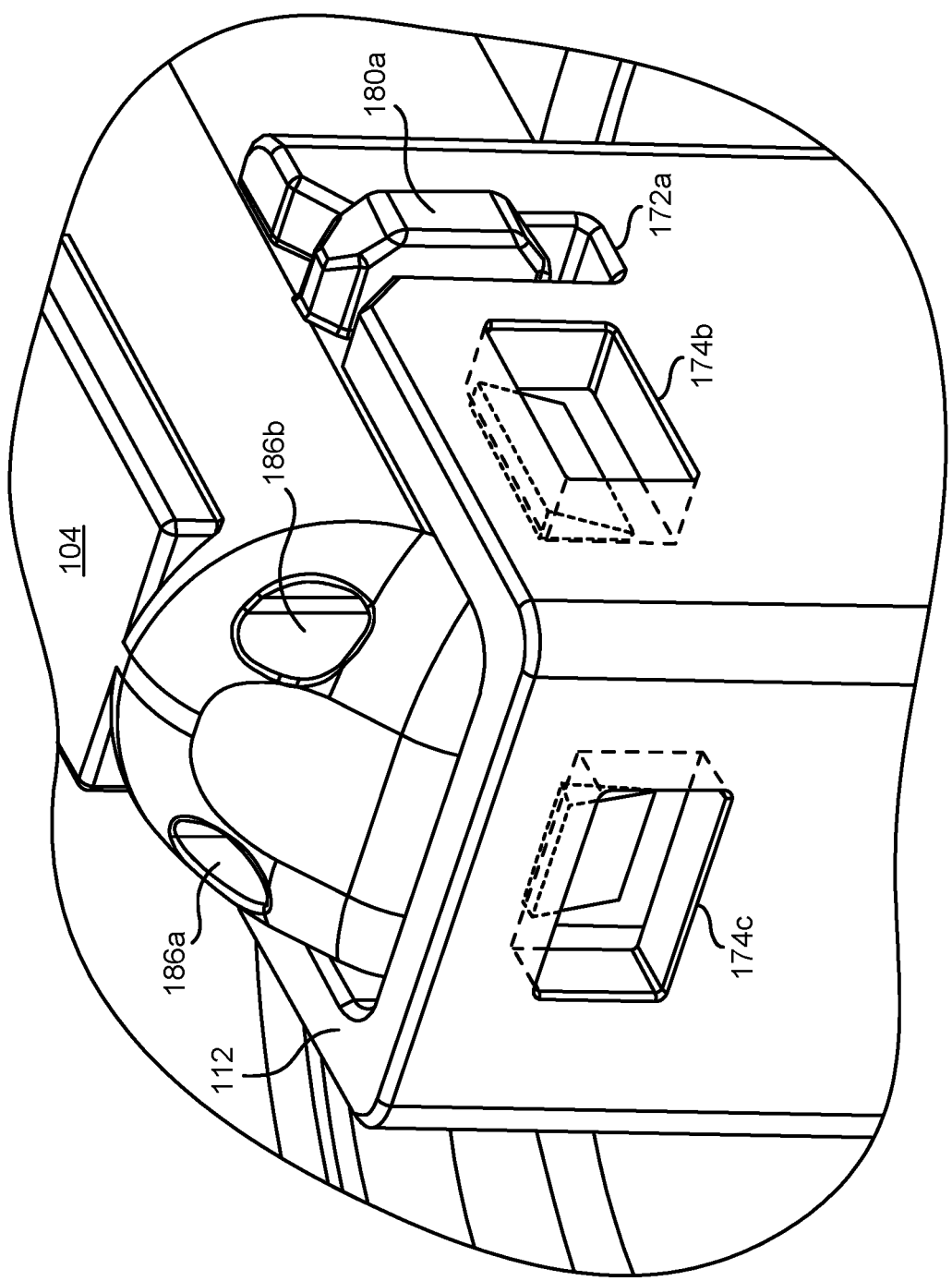
FIG. 8 is a diagram illustrating a portion of the housing assembly connected to the base assembly in accordance with an embodiment of the invention.

Referring to FIG. 8, a diagram illustrating an example of a portion of the housing assembly 104 connected to the base assembly 102 is shown in accordance with an embodiment of the invention. While the housing assembly 104 is inserted into the bearing feature 112, the alignment features 180a-180b may reside in the slots 172a-172b, and the teeth 182a-182d may reside inside the windows 174a-174d.

One or more tooling holes 186a-186b may be provided in the housing assembly 104. The tooling holes 186a-186b may be utilized during assembly to automatically hold the housing assembly 104. In various embodiments, the tooling holes 186a-186b may be used to automatically orient the housing assembly 104 so that gravity holds the sensor 124 inside the housing assembly. In some embodiments, the tooling holes 186a-186b may be used in a hold and slot type design to ensure usefulness with tight tolerances. The tooling holes 186a-186b may be applicable in common design techniques.

Figure 9:
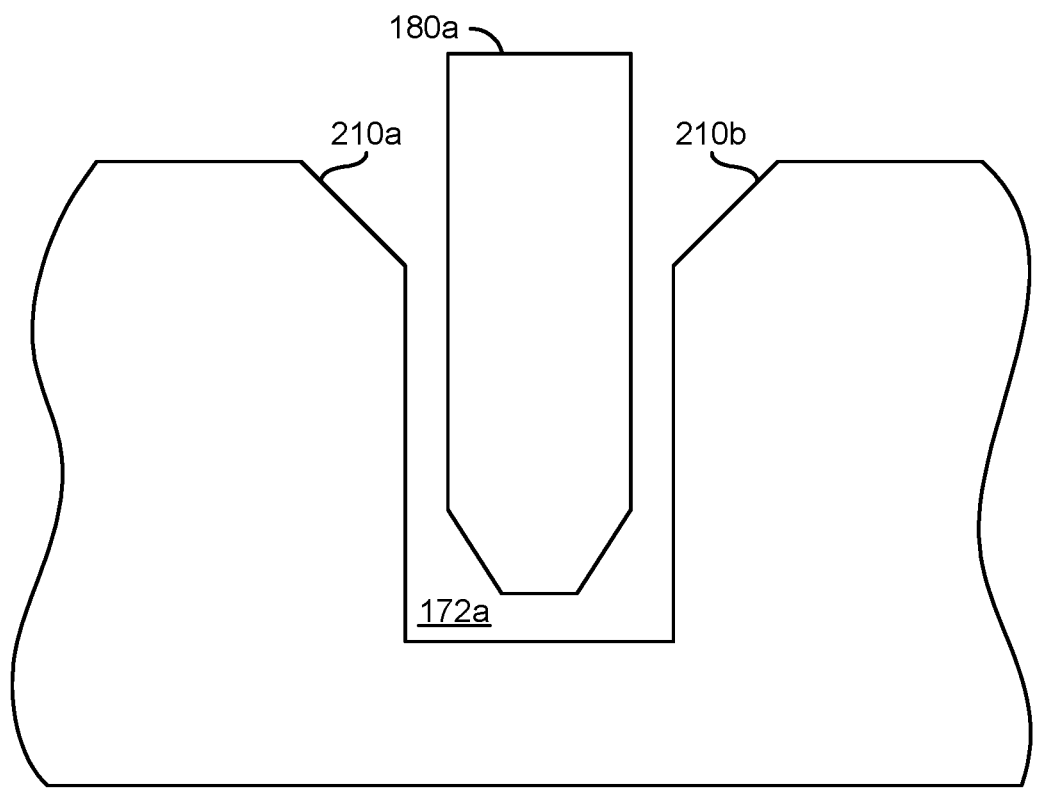
FIG. 9 is a diagram illustrating a slot and an alignment feature in accordance with an embodiment of the invention.

Referring to FIG. 9, a diagram illustrating an example implementation of the slot 172a and the alignment feature 180a is shown in accordance with an embodiment of the invention. The slot 172a of the base assembly 102 may be shaped to accept the alignment feature 180a of the housing assembly 104. An open end of the slot 172a may include beveled edges 210a-210b. The beveled edges 210a-210b may widen the slot 172a at the open end. In various embodiments, the free end of the alignment feature 180a may be tapered. The widened opening and tapered free end may assist in guiding and centering the alignment feature 180a in the slot 172a. Likewise, the slot 172b may have beveled edges shaped to accept and guide the alignment feature 180b.

Figure 10:
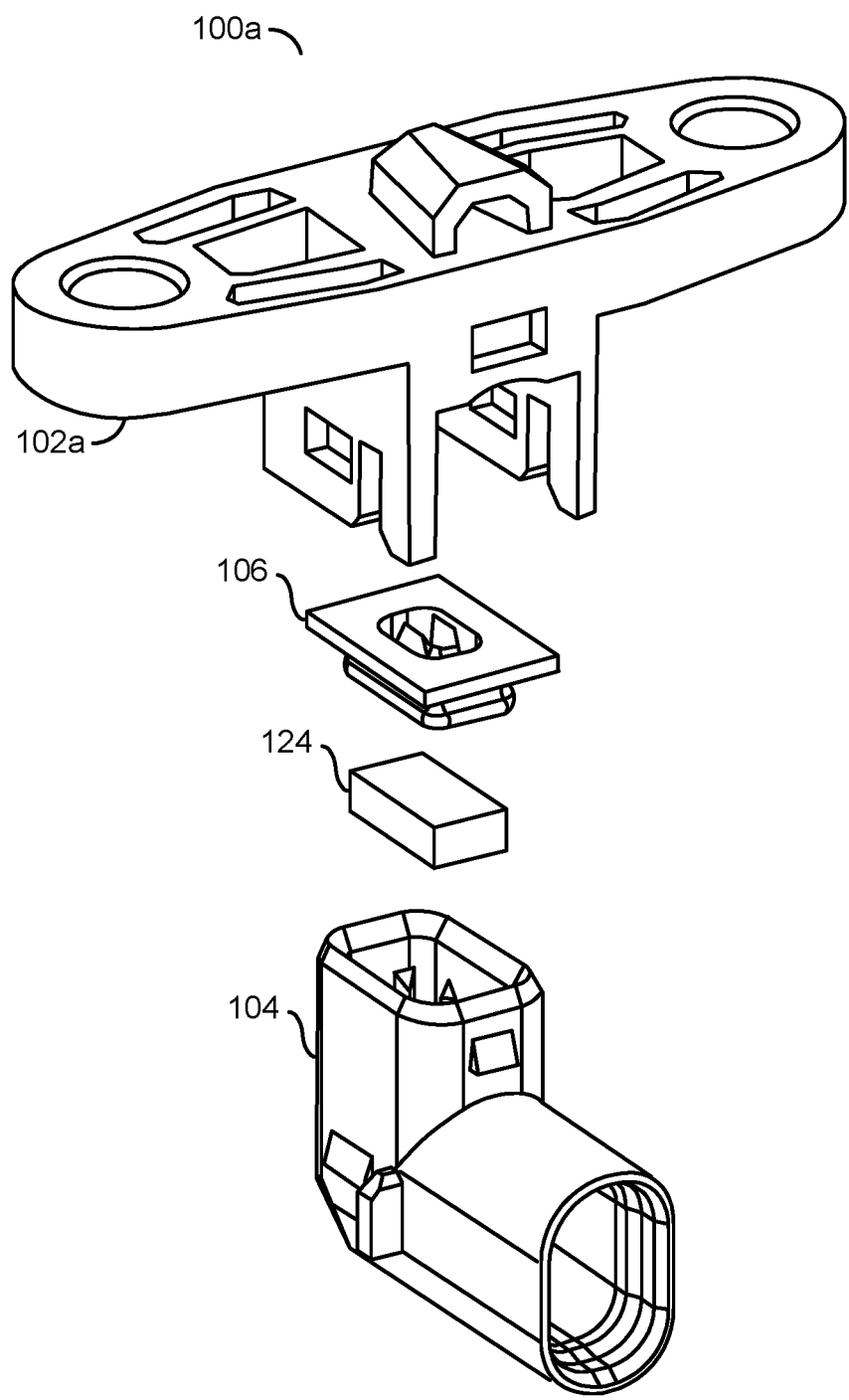
FIG. 10 is a diagram illustrating another sensor unit in accordance with an embodiment of the invention.

Referring to FIG. 10, a diagram illustrating an example implementation of another sensor unit 100a is shown in accordance with an embodiment of the invention. The sensor unit 100a may be a variation of the sensor unit 100. The sensor unit 100a generally comprises a base assembly 102a, the housing 104, the gasket 106 and the sensor 124.

The base assembly 102a may be design to be directly attached to a structure of a vehicle. The base assembly 102a may include the same bearing feature 112 as the base assembly 102. Therefore, the same housing assembly 104, the same gasket 106 and same sensor 124 may be used in the sensor unit 100a as in the sensor unit 100.

Figure 11:
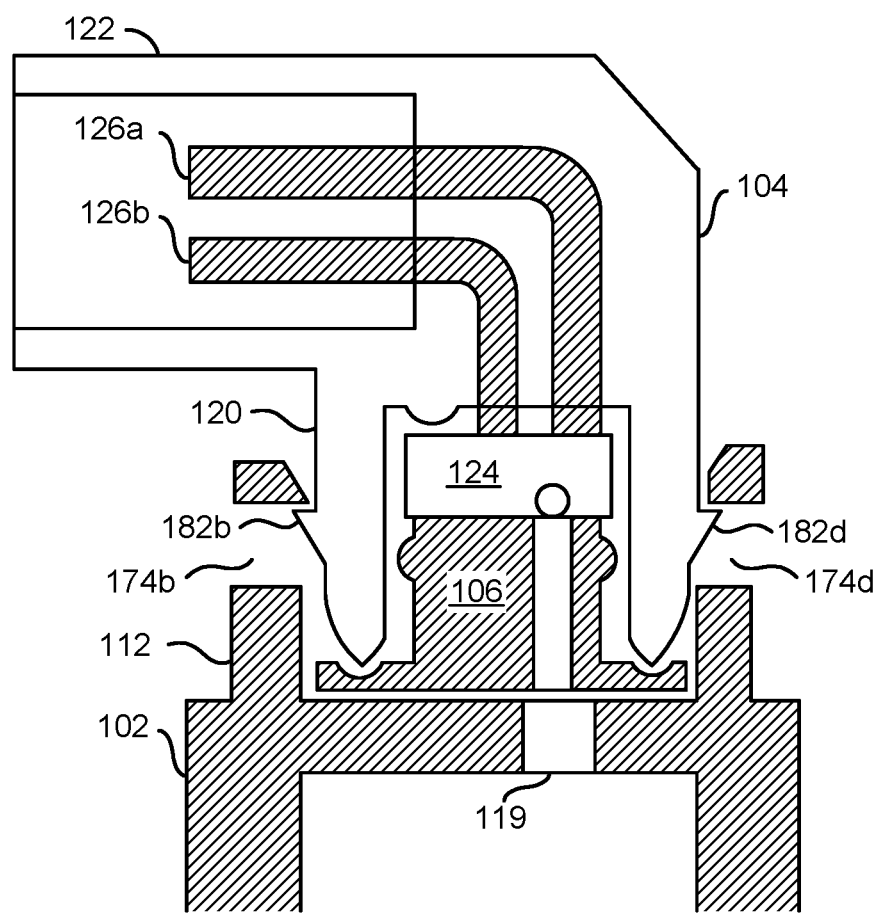
FIG. 11 is a diagram illustrating cross-sectional view of the gasket in accordance with an embodiment of the invention.

Referring to FIG. 11, a diagram illustrating an example cross-sectional view of the gasket 106 and the housing assembly 104 is shown in accordance with an embodiment of the invention. The base assembly 102 may include the bearing unit 112 with the windows 174a-174d. The sealing feature 120 of the housing assembly 104 may include the teeth 182a-182d that engage the corresponding windows 174a-174d to lock the housing assembly 104 to the base assembly 102. The electrical terminals 126a-126b may be included in the housing assembly 104 to provide electrical power to the sensor 124 and convey data generated by the sensor 124 to an electronic control unit.

Figure 12:
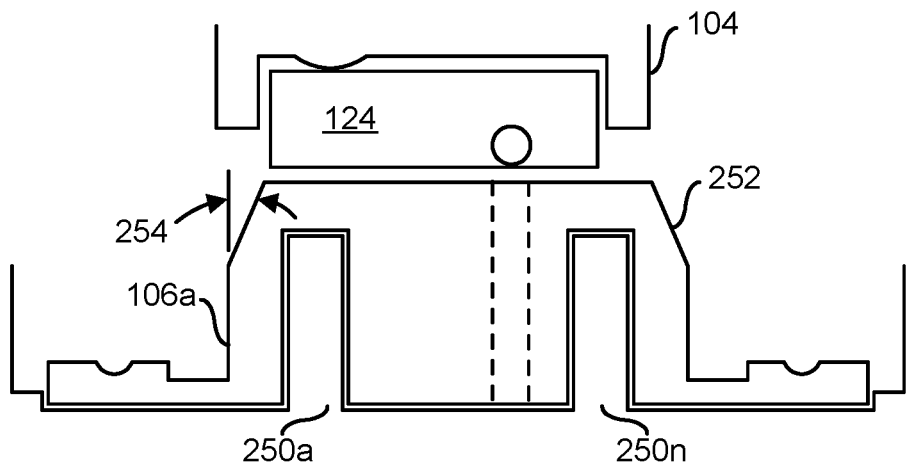
FIG. 12 is a diagram illustrating another gasket in accordance with an embodiment of the invention.

Referring to FIG. 12, a diagram illustrating an example design of another the gasket 106a is shown in accordance with an embodiment of the invention. The gasket 106a may be a variation of the gasket 106. The gasket 106a may include slots for multiple embedded posts 250a-250n and an angled portion 252.

The embedded posts 250a-250n may be aligned with the outer edges of the sensor 124. The embedded posts 250a-250n may be operational to provide additional support (or stiffness) in the gasket 106a. In various embodiments, the embedded posts 250a-250n may be fabricated from plastic as part of the base assembly 102 and the gasket 106a formed around the posts 250a-250n. In some embodiments, the embedded posts 250a-250n may be fabricated as part of the gasket 106a prior to mounting to the base assembly 102.

The angled portion 252 may expand the size of the gasket 106a to accommodate the embedded posts 250a-250n. The angled portion 252 may be formed at an angle 254 in a range of 5 degrees to 60 degrees as measured from a wall of the gasket 106. Other angles may be implemented to meet the design criteria of a particular application.

Figure 13:
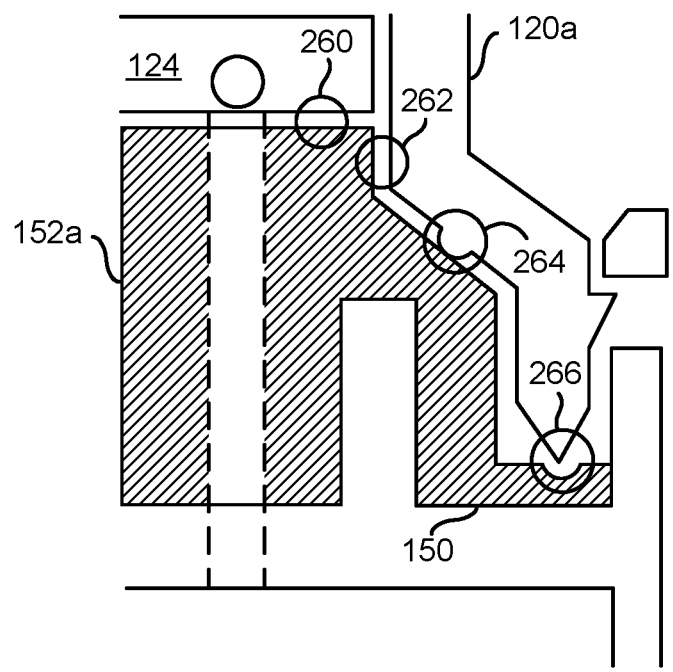
FIG. 13 is a diagram illustrating a partial view of the gasket of FIG. 12 in accordance with an embodiment of the invention.

Referring to FIG. 13, a diagram illustrating a partial view of the gasket 106a is shown in accordance with an embodiment of the invention. Multiple seal areas 260-266 may be created between the housing assembly 104 and the base assembly 102. The sensor 124 may produce a seal area 260 to the open face 154 of a column portion 152a. Portions of a sealing feature 120a may produce additional seal areas 262, 264 and 266 with the column portion 152a.

The seal area 262 may be created by a bend portion of the sealing feature 120a engaging the outer walls of the column portion 152a near the free end of the column portion 152a. The free end of the column portion 152a may have slightly larger dimensions than the spacing of the sealing feature 120a. As the sealing feature 120a is moved toward the base assembly 102 (downward in the figure), the sealing feature 120a may contact and compress the gasket material in the column portion 152a thereby forming the seal area 262. The sealing feature 120a may include a ridge (or rib) facing inward toward the angled portion 252. The ridge may contact and compress the angled portion 252 to form the seal area 264. The end of the sealing feature 120a may provide the seal area 266 with the groove 162 in the base portion 150.

Figure 14:
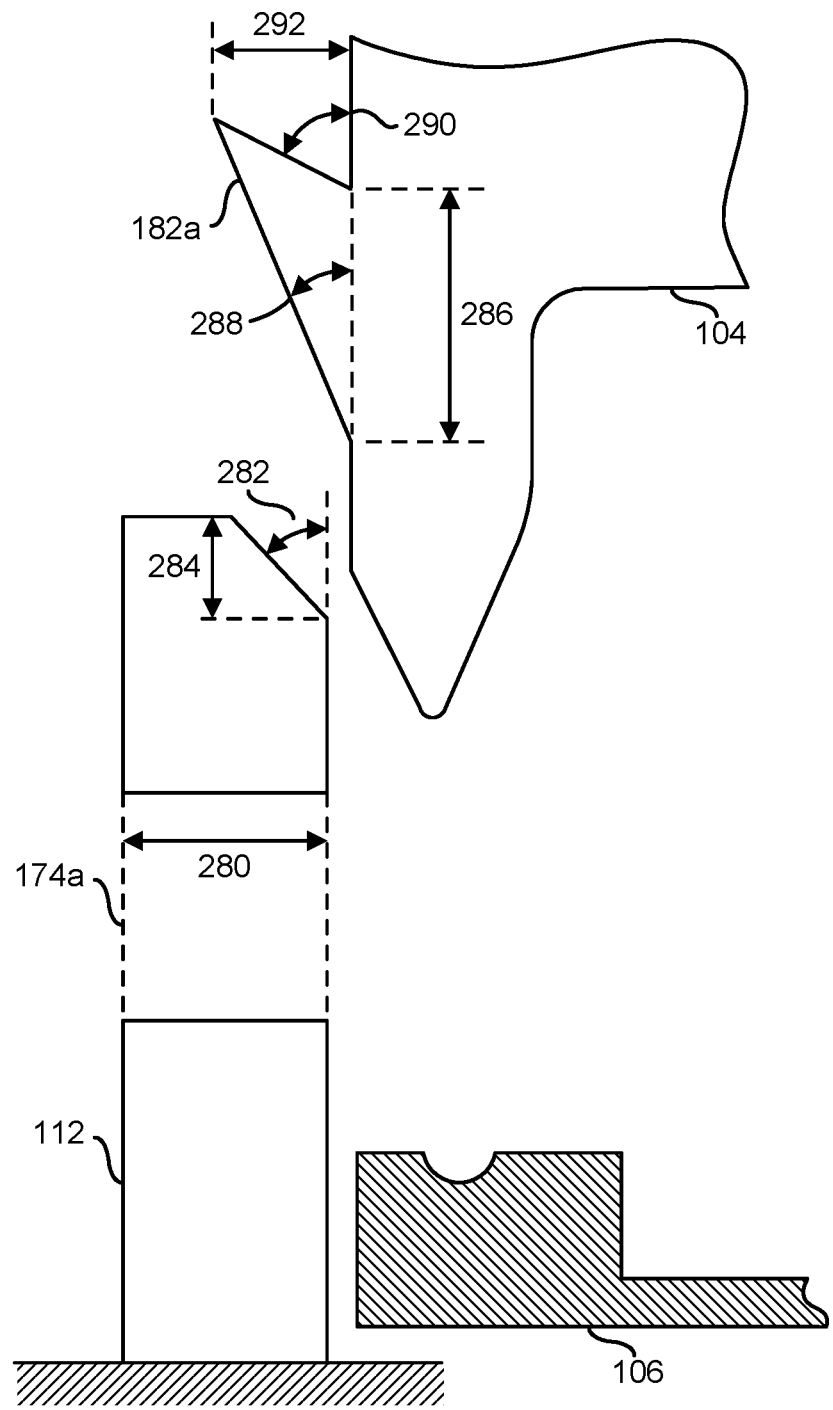
FIG. 14 is a diagram illustrating details of the housing assembly and the bearing feature in accordance with an embodiment of the invention.

Referring to FIG. 14, a diagram illustrating an example detailed design of the housing assembly 104 and the bearing feature 112 is shown in accordance with an embodiment of the invention. The housing assembly 104 may include the teeth 182a-182d (tooth 182a shown) around an outside perimeter. A leading edge of the teeth 182a-182d may be shaped at an angle 288 relative to a side of the housing assembly 104. In various embodiments, the angle 288 may range from approximately 50 degrees to approximately 70 degrees. A trailing edge of the teeth 182a-182d may be shaped at an angle 290 relative to the side of the housing assembly 104. The angle 290 may range from approximately 50 degrees to approximately 90 degrees. A thickness 292 of the teeth 182a-182d may range from approximately 1 mm to approximately 3 mm. Other angles and/or thicknesses may be implemented to meet the design criteria of a particular application.

The bearing feature 112 may have a thickness 280, a beveled edge, and the windows 174a-174d (window 174a shown). The thickness 280 may range from approximately 3 mm to approximately 5 mm. The beveled edge may have a slope 282 and a height 284. The slop 282 may range from approximately 30 degrees to approximately 70 degrees. The height 284 may range from approximately 0.5 mm to approximately 2 mm. Other dimensions and/or slopes may be implemented to meet the design criteria of a particular application.

Figure 15:
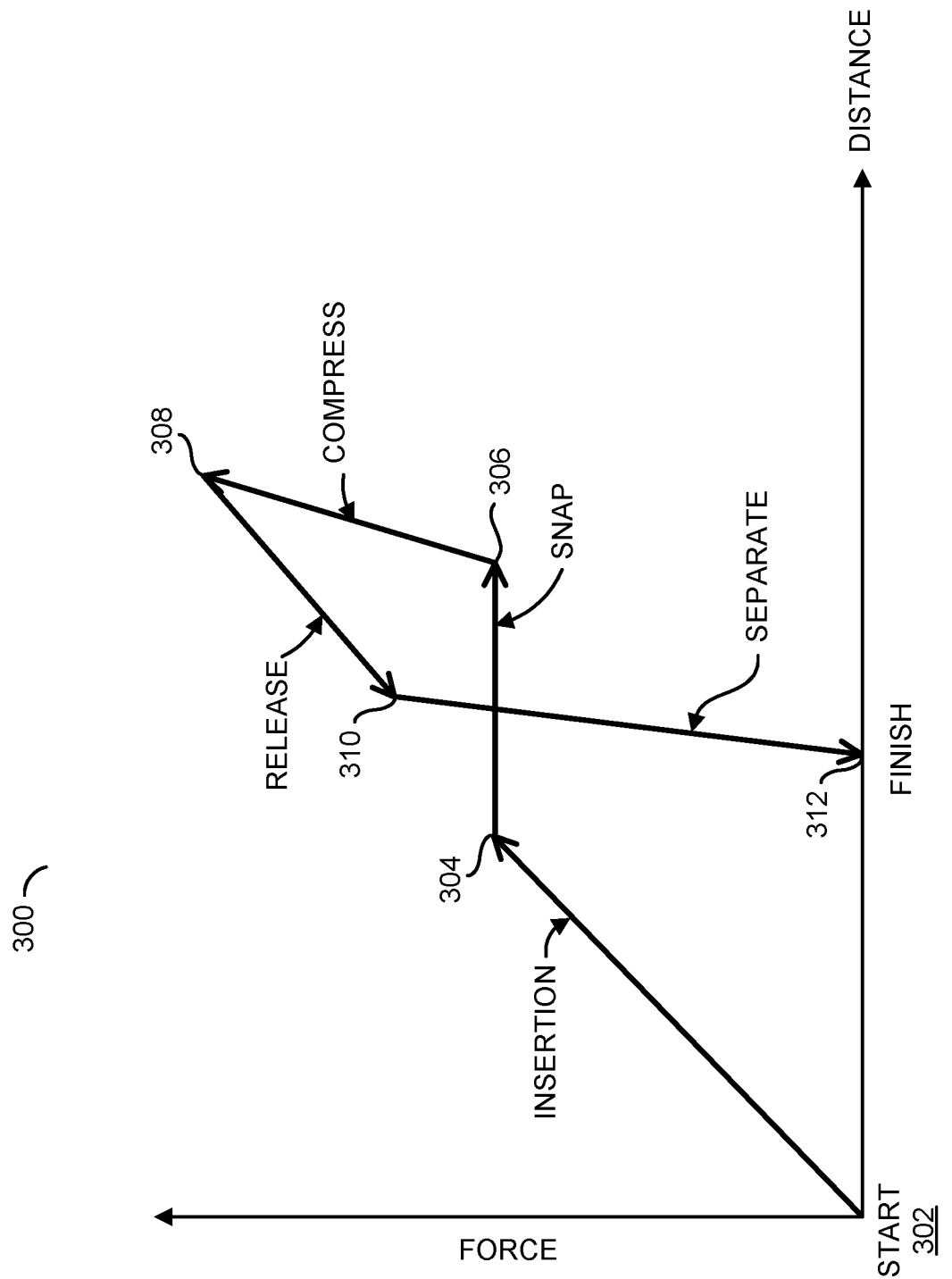
FIG. 15 is a diagram illustrating a graph of an insertion force in accordance with an embodiment of the invention.

Referring to FIG. 15, a diagram illustrating an example graph 300 of an insertion force is shown in accordance with an embodiment of the invention. The force may be zero at the point 302 until the housing assembly 104 comes into contact with the base assembly 102.

As the sealing feature 120 of the housing assembly 104 is inserted into the bearing feature 112, friction may increase causing the insertion force to increase until the point 304. At the point 304, the teeth 182a-182d may enter the windows 174a-174d. The housing assembly 104 may continue to move toward the base assembly 102 utilizing little to no additional force until the sealing feature 120 engages the gasket 106 at the point 306. Additional force applied to the housing assembly 104 may cause some additional insertion as the gasket 106 is compressed until the point 308 is reached.

Releasing of the insertion force generally allows the compressed gasket 106 to push the housing assembly 104 away from the base assembly 102 until the point 310 is reached. In various situations, the housing assembly 104 should come to rest somewhere between the point 308 and the point 310 for proper sealing. If the teeth 182a-182d and the windows 174a-174d do not stop the separation of the assemblies by the point 310, the sealing feature 120 separates from the gasket 106. Thereafter, the housing assembly 104 may move slightly further away from the base assembly 102 and the force may drop to zero at the point 312.

Figure 16:
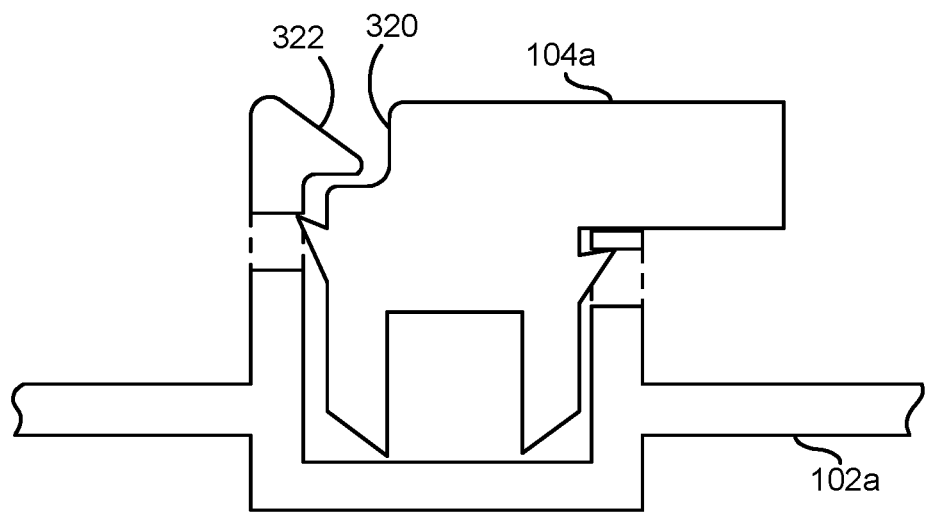
FIG. 16 is a diagram illustrating another base assembly and another housing assembly in accordance with an embodiment of the invention.

Referring to FIG. 16, a diagram illustrating an example design of a base assembly 102a and a housing assembly 104a is shown in accordance with an embodiment of the invention. The base assembly 102a may be a variation of the base assembly 102. The housing assembly 104a may be a variation of the housing assembly 104.

The housing assembly 104a may include a notch 320 in an outer surface away from the base assembly 102a. The base assembly 102a may include a clip 322. The clip 322 may engage the notch 320 while the housing assembly 104a is mated to the base assembly 102a. Engagement between the clip 322 and the notch 320 may provide an additional locking feature to hold the housing assembly 104a to the base assembly 102a.

Figure 17:
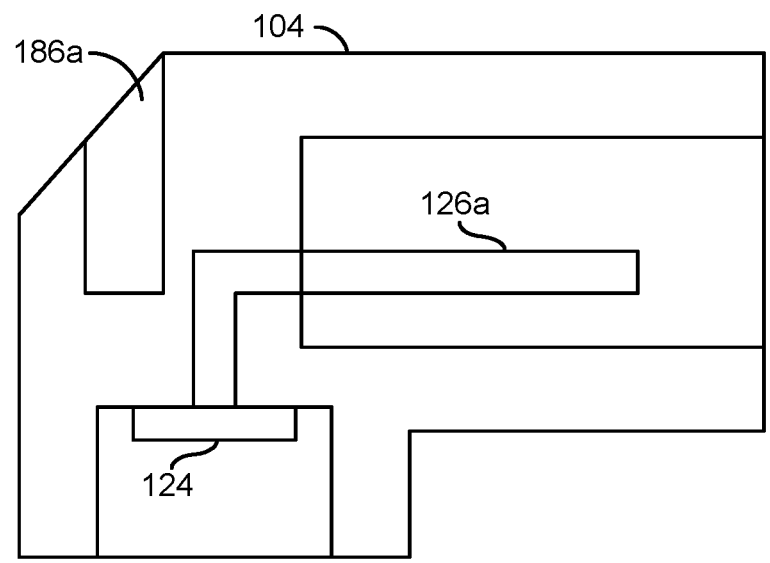
FIG. 17 is a diagram illustrating a cross-sectional view of the housing assembly in accordance with an embodiment of the invention.

Referring to FIG. 17, a diagram illustrating an example cross-sectional view of the housing assembly 104 is shown in accordance with an embodiment of the invention. The housing assembly 104 may include the tooling holes 186a-186b. Each tooling hole 186a-186b may extend from an outer surface of the housing assembly 104 into the body of the housing assembly 104. The tooling holes 186a-186b may have a depth insufficient to reach into a cavity where the sensor 124 and the terminals 126a-126b are mounted. Therefore, the tooling holes 186a-186b generally maintain the environmental seal between the housing assembly 104 and the base assembly 102.

The structures illustrated in the diagrams of FIGS. 1 to 17 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Data signals generated by the sensor units (or devices) may be transferred to one or more electronic control units. The electronic control units may utilize the sensor data in one or more transport vehicle functions including, but not limited to, engine control, transmission control, braking control, battery management, steering control, door control, human machine interface, seat control, speed control, restraint systems control, vehicle-to-vehicle communications and diagnostics. The electronic control units may include capabilities to adjust the sensor data to account for calibration issues, environmental factors and aging components.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a base assembly having a locking feature and a bearing feature, wherein said locking feature has a first passage in communication with an exterior of said apparatus;
a gasket comprising (i) a base portion having a first surface and a second surface opposite said first surface, (ii) a column portion extending orthogonally away from said base portion and having a face surface, and (iii) a second passage passing through said gasket from said first surface to said face surface, wherein said first surface is disposed on said base assembly within said bearing feature and said second passage is in communication with said first passage; and
a housing assembly having a sealing feature and configured to hold a sensor, wherein (i) said sealing feature (a) mates with said bearing feature and (b) seals to said second surface of the base portion of said gasket and (ii) an active side of said sensor (a) seals to said face surface of said column portion of said gasket and (b) is in communication with said exterior of said apparatus through said first passage and said second passage.

2. The apparatus according to claim 1, wherein (i) said bearing feature has a rectangular shape and (ii) said housing assembly snap fits to said base assembly.

3. The apparatus according to claim 1, wherein said sensor comprises a gas pressure sensor.

4. The apparatus according to claim 1, wherein said sensor measures an air pressure inside a motor vehicle.

5. The apparatus according to claim 1, wherein said base assembly is configured to be mounted to a motor vehicle.

6. The apparatus according to claim 1, wherein said base assembly is customized to one of a plurality of motor vehicles.

7. The apparatus according to claim 6, wherein said housing assembly is common to all of said motor vehicles.

8. The apparatus according to claim 1, wherein said gasket further comprises a rib (i) located about said column portion and (ii) configured to seal to an inside surface of said sealing feature.

9. The apparatus according to claim 1, wherein said second surface of said base portion of said gasket comprises a groove configured to seal to said sealing feature.

10. The apparatus according to claim 1, wherein (i) said sealing feature is rigid and (ii) said bearing feature is deformable to conform to said sealing feature.

11. The apparatus according to claim 1, wherein (i) said bearing feature is rigid and (ii) said sealing feature is deformable to conform to said bearing feature.

12. The apparatus according to claim 1, wherein (i) said sealing feature has one or more alignment features and (ii) said bearing feature has one or more slots configured to receive said alignment features.

13. The apparatus according to claim 12, wherein each of said slots has a widened opening configured to guide said alignment features into said slots.

14. The apparatus according to claim 1, wherein said housing assembly further has a plurality of alignment features configured to align said sensor with said second passage.

15. The apparatus according to claim 1, further comprising a plurality of posts (i) embedded in said column portion of said gasket and (ii) configured to stiffen said column portion, wherein said column portion has an angled portion that widens said gasket about said posts.

16. The apparatus according to claim 1, further comprising a mounting assembly having an opening configured to receive said locking feature of said base assembly to attach said base assembly to said mounting assembly.

17. An apparatus comprising:
a base assembly having a locking feature and a bearing feature, wherein said locking feature has a first passage in communication with an exterior of said apparatus;
a mounting assembly configured to attach to said base assembly;
a gasket comprising (i) a base portion having a first surface and a second surface opposite said first surface, (ii) a column portion extending orthogonally away from said base portion and having a face surface, and (iii) a second passage passing through said gasket from said first surface to said face surface, wherein said first surface is disposed on said base assembly within said bearing feature and said second passage is in communication with said first passage; and a housing assembly having a sealing feature and configured to hold a sensor, wherein (i) said sealing feature (a) mates with said bearing feature and (b) seals to said second surface of the base portion of said gasket and (ii) an active side of said sensor (a) seals to said face surface of said column portion of said gasket and (b) is in communication with said exterior of said apparatus through said first passage and said second passage.

18. The apparatus according to claim 17, wherein (i) said bearing feature has a rectangular shape, (ii) said housing assembly snap fits to said base assembly and (iii) said sensor comprises a gas pressure sensor configured to measure a pressure inside a motor vehicle.

19. The apparatus according to claim 17, wherein said sealing feature is configured to form an environmental seal with said gasket while said housing assembly is mated to said base assembly.

20. The apparatus according to claim 17, wherein (i) said housing assembly further comprises a connector portion configured to connect said sensor to an external electrical connector.

* * * * *